United States Patent

[11] 3,620,963

[72] Inventor Bernard F. Mulaskey
Fairfax, Calif.
[21] Appl. No. 29,700
[22] Filed Apr. 17, 1970
[45] Patented Nov. 16, 1971
[73] Assignee Chevron Research Company
San Francisco, Calif.
Continuation-in-part of application Ser. No. 568,536, July 28, 1966, now abandoned,
Continuation-in-part of application Ser. No. 645,855, June 8, 1967, now Patent No. 3,399,132, Continuation-in-part of application Ser. No. 742,321, July 3, 1968, now Patent No. 3,487,007, Continuation-in-part of application Ser. No. 774,207, Nov. 7, 1968, now Patent No. 3,520,829.

[54] CATALYTIC DEWAXING
11 Claims, No Drawings
[52] U.S. Cl. .................................................. 208/111,
208/28, 208/DIG. 2, 252/455 Z
[51] Int. Cl. ...................................................... C10g 13/02

[50] Field of Search .......................................... 208/111,
DIG. 2, 28

[56] References Cited
UNITED STATES PATENTS
| | | | |
|---|---|---|---|
| 3,401,125 | 9/1968 | Jaffe .............................. | 252/453 |
| 3,523,887 | 8/1970 | Hanson et al. ................ | 208/111 |
| 3,539,498 | 11/1970 | Morris et al. ................. | 208/111 |

Primary Examiner—Herbert Levine
Attorneys—A. L. Snow, F. E. Johnston, G. F. Magdeburger, C. J. Tonkin and T. G. De Jonghe ABSTRACT: A process for catalytically dewaxing an oil which comprises contacting the oil at a temperature between 500° and 900° F., a pressure between 300 and 5,000 p.s.i.g., and in the presence of hydrogen, with a catalyst comprising a mixture of mordenite and an amorphous porous inorganic oxide associated with nickel and tin. Preferably the mixture of mordenite and the nickel-tin component is a physical mixture, i.e., preferably the nickel and tin are not supported on the mordenite, as by impregnation or ion-exchange into the mordenite. Preferably, the amorphous porous inorganic oxide associated with the nickel and tin is silica.

CATALYTIC DEWAXING

CROSS-REFERENCES

This application is a continuation-in-part of application Ser. No. 774,207, filed Nov. 7, 1968, now U.S. Pat. No. 3,520,829 which in turn is a continuation-in-part of application Ser. No. 742,321, filed July 3, 1968, now U.S. Pat. No. 3,487,007, which is in turn a continuation-in-part of application Ser. No. 645,855, filed June 8, 1967, now U.S. Pat. No. 3,399,132, which in turn is a continuation-in-part of application Ser. No. 568,536, filed July 28, 1966, now abandoned. The disclosures of the aforementioned patents and applications are incorporated by reference into the present application, particularly those portions relating to hydroconversion reactions and catalyst compositions containing nickel, tin and an inorganic oxide carrier.

BACKGROUND OF THE INVENTION

This invention relates to processes for lowering the pour points of hydrocarbon oils and to processes involving treating lubricating oil stocks with hydrogen in the presence of catalysts. More particularly, the present invention relates to catalytic dewaxing using a catalyst mass of crystalline alumino-silicate molecular sieve and nickel and tin.

To be suitable for use as lubricants, hydrocarbon oils are generally required to be sufficiently high boiling to have low volatility and a high flash point. Superior lubricating properties are obtained if the oil is composed primarily of saturated hydrocarbons comprising paraffins and cycloparaffins, with a minimum content of aromatics. The oils are required to flow freely, and thus generally must have pour point not in excess of about +35° F., and more usually pour points of +15° F., +5° F., or 0° F. or lower are specified. Many other oil products not designed for use as lubricants, spray oils for example, desirably have these same properties of low volatility, high flash point, high paraffin content, and low pour point.

Normal paraffins and waxes present in virtually all high-boiling portions of crude petroleum impart a high pour point to the oil fractions as obtainable directly by distillation, and accordingly the oils must be treated to meet the low pour point specifications. Treating procedures of two kinds have been described in the prior art. One type of procedure involves combining low-boiling materials (i.e., materials boiling below about 550° F.) with the high-boiling portions or, if the initial oil contains both high- and low- boiling portions, leaving both portions in the finished product. This procedure is unsatisfactory, for it produces wide-boiling range end products, which have components boiling below 550° F. and are thus unsatisfactory for use as lubricants. Another procedure which is described in the art is one in which the high-boiling portions are dewaxed. Most dewaxing procedures heretofore used have required at least one step of physically separating wax from the oil, though a variety of procedures have been developed. Thus the oil may be cooled to a low temperature sufficient to crystallize out hard, normal paraffin wax; and the wax can then be physically separated by filtration, centrifugation, or like methods. More commonly, solvent dewaxing is employed wherein a solvent, such as a mixture of methylethylketone and benzene is added, which preferentially dissolves the nonwaxy hydrocarbons and lowers the oil viscosity without appreciably lowering the crystallization temperature of the wax, but the wax must still be separated physically as before. In addition, it is frequently necessary to use mechanically complicated, internally scraped, heat exchangers in the chilling procedures. Other methods have been devised involving forming complexes with the wax molecules, such as in the urea adduction process; but again a physical separation of the wax or wax adduct or complex is needed.

The physical separation dewaxing methods heretofore used are costly to build and to operate because of the large amount of equipment needed for the mechanical handling, which must be done at low throughputs to accomplish the physical wax separation. Thus is a typical process for producing lubricating oils comprising several steps including, for example, solvent extraction, acid treating, hydrofining, clay contacting, and solvent dewaxing—the dewaxing step is the most costly treating step.

Various catalytic dewaxing processes have been proposed recently. For example, U.S. Pat. No. 3,125,511 relates to a catalytic hydrocarbon treatment process to obtain a lower pour point product. According to the process disclosed in U.S. Pat. No. 3,125,511, a hydrocarbon fraction boiling above 150° C. is contacted in the presence of hydrogen with a catalyst comprising a platinum group metal on a support containing a major proportion of alumina and at least 1 percent weight of halogen at a temperature of at least 600° F., a pressure of at least 100 p.s.i.g., and a space velocity not exceeding 8.0 v./v./hr., the temperature and space velocity used being correlated to give a product boiling above 150° C. having a pour point at least 5° F. lower than the pour point of the feedstock.

U.S. Pat. 3,268,439 discloses a process for the conversion of waxy hydrocarbons which is similar to the process disclosed in U.S. Pat. No. 3,125,511.

A more recent patent, U.S. Pat. No. 3,438,887, discloses a process for the production of lubricating oils by the process sequence of solvent refining, catalytic dewaxing, and hydrofining. The catalyst used for the catalytic dewaxing step consists of a hydrogenating component such as platinum supported on a low-sodium mordenite. The disclosure of U.S. Pat. No. 3,438,887 is incorporated by reference into the present patent specification. According to the disclosure in U.S. Pat. 3,438,887, the hydrogenating component is supported on the mordenite and the hydrogenating component may be a group VIII or group VI metal, but noble metals such as platinum, palladium and rhodium are preferred.

SUMMARY OF THE INVENTION

According to the present invention, a process is provided for the catalytic dewaxing of an oil, which process comprises contacting the oil at a temperature between 500° and 900° F., a pressure between 300 and 5,000 p.s.i.g., and in the presence of hydrogen, with a catalyst comprising a mixture of mordenite and an amorphous porous inorganic oxide associated with nickel and tin.

A critical feature of the present invention is the use of tin, particularly nickel and tin, in association with a porous inorganic oxide as part of the catalyst mass used to accomplish the catalytic dewaxing. The use of group VIII and group VI metals on mordenite is suggested, for example, in U.S. Pat. No. 3,438,887, but metals such as group IVa metals, particularly tin, is not suggested in conjunction with mordenite for catalytic dewaxing.

In the process of the present invention, it is preferred to use between 2 and 50 combined weight percent tin plus nickel with a weight ratio of nickel to tin between 0.25 and 20 for the nickel-tin-amorphous porous inorganic oxide. Preferably the mordenite component of the catalyst mass is in the hydrogen form.

The amount of mordenite used together with the nickel-tin-amorphous porous inorganic oxide generally is between about 10 and 85 weight percent mordenite based on the total weight of the catalyst mass and preferably is between 65 to 85 weight percent mordenite.

It is particularly preferred in the process of the present invention to use a catalyst mixture comprising a physical mixture of discrete particles of mordenite and discrete particles of nickel-tin-amorphour porous inorganic oxide. The discrete particles of the mordenite component and the nickel-tin component can be prepared by simply mixing small catalyst particles of each of these components. Mordenite powder can be mixed with nickel, tin silica hydrogel followed by forming the mass into a catalyst particle, as for example, by extrusion. Alternately, nickel-tin-porous inorganic oxide particles may be mixed with very fine mordenite particles and then pelleted, cast, molded, or otherwise formed into pieces of desired size and shape, such as rods, spheres, pellets, or other configurations. The particle size of the individual components of the physical mixture may be very small, e.g., less than about 50 microns. Alternately, the particles may be sufficiently large and distinct as to permit ready separation thereof by mechanical means which in turn makes possible separate regeneration, reactivation, and replacement of the two components. Accordingly, the particle size of the two components making up a particle form physical mixture may fall within the approximate range of two to 50 mesh (Tyler), but the mordenite is usually a fine powder with particle sizes in the 1 to 50 micron range.

We have found that it is preferable to carry out the catalytic dewaxing process at a temperature within the range of about 550° to 750° F. and at a relatively low pressure within the range of about 750 to 1,500 p.s.i.g. when using the process of the present invention. Hydrogen rates are preferably between 500 and 10,000 SCF per barrel of oil feed.

Preferably, feedstocks for the process of the present invention are hydrocarbon feedstocks, particularly lube oil stocks, boiling below about 1,050° F. and preferably below 1,000° F. Feedstocks boiling within the range 650 to 1,00° F. are preferred. The wax content of the feedstock may range from a few percent up to as high as 20 to 40 weight percent and usually is in the range of about 5 to 20 weight percent wax.

The amorphous porous inorganic oxide of the nickel-tin component of the catalyst mass used in the present invention is preferably silica. We have found that less undesired cracking to light hydrocarbons can be obtained when using silica together with the nickel and tin. In particular, silica is preferred over alumina for use in conjunction with the nickel and tin, as alumina generally has slightly more acidity or cracking activity (and more potential to become acidic due to impurities in the feed) than the silica and it is believed that this causes the nickel-tin component performance to be less advantageous in the process of the present invention than when using silica. It is particularly preferred to use for the nickel tin component catalyst particles or material consisting essentially of nickel, tin, and silica.

DETAILED DESCRIPTION OF THE INVENTION

The catalyst used in the process of the present invention is a mixture of two components: (1) mordenite and (2) an amorphous porous inorganic oxide, e.g., silica, containing nickel, or compounds thereof, and tin, or compounds thereof, in an amount of from 2 to 50 combined weight percent metals with a nickel to tin weight ratio of 0.25 to 20. The weight percents of the nickel and tin, or their compounds, are determined on the basis of the amorphous porous inorganic oxide component of the catalyst. Preferably the mordenite component of the catalyst is present in an amount from 10 to 85 weight percent and more preferably from 20 to 80 weight percent, based on the finished catalyst composition or the finished catalyst mass.

In the process of the present invention, zeolites other than mordenite are not satisfactory. The term "Zeolites" is used herein to refer to both natural and synthetic crystalline aluminosilicate molecular sieves. Zeolites such as zeolite A, zeolite X, zeolite Y and faujasite are not satisfactory in the process of the present invention. The particular effectiveness of mordenite in the process of the present invention is believed attributable to the size range of the pores in mordenite.

Mordenite has an ordered crystallite structure having a ratio of silicon atoms to aluminum atoms of about 5 to 10. The sodium form can be represented by the following formula:

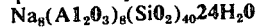

$$Na_8(Al_2O_3)_8(SiO_2)_{40}24H_2O$$

Mordenite can exist or be prepared having cations other than sodium; for example, mordenite can be prepared having a cation of lithium, potassium, calcium and the like.

Mordenite's ordered crystallite structure is believed to be made up of chains of five-membered rings of tetrahedra and its adsorbency suggests a parallel system of channels having a free diameter on the order of 4 A to 6.6 A, interconnected by smaller channels, parallel to another axis, on the order to 2.8 A free diameter.

Although mordenite is generally prepared in the sodium form, it is preferred for purposes of the present invention that the sodium ions be replaced with other ions lower in the electromotive series than sodium. The sodium ion concentration on the mordenite should preferably be less than about 5 weight percent and more preferably less than about 1 weight percent. Thus, the mordenite may contain, in place of sodium, an ion such as, for example, calcium, magnesium, strontium, barium, rare earth metal ions, group IV–VIII metal ions, etc. It is particularly preferred that the mordenite exist substantially in the ammonium or hydrogen form and that it be maintained substantially free of any catalytic loading metal or metals. The hydrogen form of mordenite can be prepared by conventional techniques which include the exchange of mordenite with acid solution, or more commonly and preferably, conversion of the mordenite to the ammonium form via base exchange with an ammonium salt and calcination of the resultant ammonium-form mordenite to cause thermal degradation of the ammonium ions and formation of the desired hydrogen cation sites.

The other component of the catalyst mixture used in the present invention comprises an amorphous porous inorganic oxide having associated therewith nickel and tin or their compounds. The amorphous porous inorganic oxide preferably has a surface area of 50 to 750 m.²/g. preferably 150 to 750 m.²/g. The carrier can be natural or synthetically produced inorganic oxides or a combination of inorganic oxides. Typical inorganic oxide supports which can be used are silica, alumina, magnesia, and zirconia. Combinations of amorphous porous inorganic oxides can be used, e.g., silica-alumina, silica-magnesia, silica-zirconia, silica-magnesia-titania, and silica-alumina-zirconia. However, these mixed oxides have greater acidity than pure oxides in most instances. Therefore, when using mixed oxides, it is preferred to reduce the acidity of the support with a neutralizing component such as lithium.

A particularly preferred amorphous porous inorganic oxide carrier is silica. A variety of methods are available for producing suitable silica supports. Silica can be produced by hydrolyzing tetraethyl orthosilicate with aqueous HCl solution. Likewise, silica can be prepared by contacting silicon tetrachloride with a cold methanol and water solution or with 95 percent ethyl alcohol, or with cold water or ice. Also silica can be prepared by contacting sodium silicate with an ion-exchange resin to remove the sodium or by contacting with an acid at a pH of about 2.5 or less. Further, silica can be prepared by adding $CO_2$, preferably under pressure, to sodium silicate.

The amorphous porous inorganic oxide will have in association therewith nickel and tin or their compounds. Preferably, the nickel and tin will be present in an amount of from 2 to 50 combined weight percent metals based on the amorphous porous inorganic oxide component of the catalyst mixture. Regardless of the form in which the nickel and tin exist on the catalyst, whether as metallic nickel and metallic tin, or compounds of nickel and compounds of tin, such as the oxides or sulfides, the total combined weight percent of the nickel and tin associated with the amorphous porous inorganic oxide, calculated as the metal, should be from 2 to 50. Preferably the nickel and tin, or compounds thereof, are present in an amount of from 5 to 30 combined weight percent and more preferably from 7 to 25.

The nickel and tin, or their compounds, should be present in association with the amorphous porous inorganic oxide in a weight ratio of nickel to tin of from 0.25 to 20 determined as the metals. Preferably the nickel to tin weight ratio is from 0.5 to 20 and more preferably from 0.5 to 10. In general, when employing high combined weights of nickel and tin, it is preferred to use high nickel to tin weight ratios.

The portion of the catalyst comprising the amorphous porous inorganic oxide in association with nickel and tin can be prepared by any of the conventional methods for associating catalytically active amounts of hydrogenating metal components with the carrier. Thus, the nickel and tin components can be associated with an amorphous porous inorganic oxide by impregnation or by ion-exchange. Impregnation is generally accomplished using an aqueous solution of a suitable nickel compound and/or tin compound. Either simultaneous or sequential impregnation of the metal components is suitable. Ion-exchange is generally accomplished by using an aqueous solution of a suitable nickel and/or tin salt wherein the nickel and/or tin is present in the cationic state. As examples, in the preparation of a catalyst wherein the carrier is an amorphous silica-alumina, the nickel and tin are normally associated with the silica-alumina by impregnation. Typical nickel and tin compounds which can be used for impregnation or ion-exchange are the chlorides, nitrates, sulfates, acetates, and amine complexes. The tin can be in the stannous or stannic oxidation state.

The nickel and tin, or their compounds, can be associated with the amorphous porous inorganic oxide by coprecipitation or cogelation of a mixture of compounds of the hydrogenating metals and compounds of the metals and/or nonmetals whose oxides form the amorphous porous inorganic oxide carrier. Both hydrogenating metal components can be coprecipitated or cogelled with the compounds of the metals and/or nonmetals whose oxides form the inorganic oxide carrier; or, one of the hydrogenating metal components can be associated with the amorphous porous inorganic oxide carrier by coprecipitation or cogelation, and the other hydrogenating metal component then intimately associated with the coprecipitated composite by impregnation or other suitable means. For example, a coprecipitated composite of tin, or compound thereof, and silica-alumina can be prepared by coprecipitating a mixture of stannous chloride, aluminum chloride, and sodium silicate. Nickel, e.g., as nickel chloride, can then be intimately associated with the coprecipitated composite by impregnation.

A preferred method of preparation of the novel catalytic composition of the present invention is by simultaneous coprecipitation, or cogelation, of a mixture of nickel and tin compounds, and compounds of the metals and/or nonmetals whose oxides form the amorphous porous inorganic oxide carrier. The method of preparation of a coprecipitated composite of only one of the hydrogenating metals and an amorphous porous inorganic oxide is, in general, the same as that for a coprecipitated composite of both metals and an amorphous porous inorganic oxide. For the sake of brevity, the preparation of a coprecipitated composite will be described only in terms of using both hydrogenating metals in the coprecipitated composite. In general, preparation of the coprecipitated composite can be accomplished by forming a solution and/or a sol of the compounds, subsequently precipitating the mixture, preferably at a pH from about 5.5 to 8, by the addition of a precipitating agent as, for example, a base, and then washing the coprecipitated composite to remove extraneous materials. Finally, the coprecipitated composite can be dried and then calcined at an elevated temperature. Thus, for example, a coprecipitated composite comprising nickel and tin intimately associated with silica-alumina can be prepared by forming an aqueous solution of aluminum chloride, sodium silicate, nickel chloride and stannous chloride. The solution can then be coprecipitated by the addition of ammonium hydroxide; thereafter the coprecipitated composite can be washed, dried and calcined.

In order to prepare a coprecipitated composite comprising an amorphous porous inorganic oxide and nickel and tin components, it is desirable that the starting components be such that when admixed together the resulting mixture will form a solution and/or sol so as to obtain uniform dispersion throughout the mixture.

The compounds in the initial mixture can advantageously be salts, such as the nitrates, citrates, formates, alcoxides, and sulfates. Preferably chlorides and acetates are employed. In view of the process advantages of using chloride salts due to their readiness to form solutions with other compounds, their commercial availability and relatively low price, it is often desirable to employ them. The anion content, e.g., chloride, in the final coprecipitate is preferably reduced to below about 0.25 percent of the total weight of the final coprecipitate. Washing with water can often effectively lower than anion content to the desirable limit. If anions are present in the coprecipitate which are difficult to remove by washing, such anions can be ion-exchanged with anions more easily removed by washing. Preferred anions for use in ion-exchange are the bicarbonates, carbonates, acetates and formates.

After formation of the initial mixture, it is coprecipitated by conventional techniques. Precipitation is preferably conducted at a pH between about 5.5 and about 8. Thus, the initial mixture, if acidic, can be precipitated by the addition of a base. If the mixture is basic, it can be precipitated with an acid. The precipitation can be step wise, as by a form of titration, or simultaneous, as by mixing of acidic or basic solutions, as the case may be, in the proper ratios. It is preferable that the precipitating agent should not introduce any components in the mixture that are deleterious.

Following precipitation of the mixture of compounds, the excess liquid is usually removed by filtration. There after the precipitate is washed and ion-exchanged to remove impurities. Washing is generally conducted in more than one step, using water or dilute aqueous solutions of ammonium salts, e.g., ammonium acetate. The coprecipitated composite is then dried in air or inert gases at a temperature less than 400° F., preferably from about 150° to 300° F. The coprecipitate is than calcined, generally at a temperature of from about 750° to 1,400° F. in the presence of an oxygen-containing gas.

As discussed above, the catalyst mass used in the catalytic dewaxing process of the present invention is preferably composed of a physical mixture of mordenite discrete particles and nickel-tin-amorphous porous inorganic oxide. The discrete mordenite particle sizes may be quite small, ranging from about 1 or 2 microns up to several hundred microns or more. Also, the mordenite component can be in a macro-size particle from such as one-sixteenth inch pellets or cylinders and also the nickel-tin component can be in macro size, such as one-sixteenth inch or one-eight inch extrudate or pellets. In any case, the nickel and tin are not supported on the mordenite but instead are present in the catalyst mass as a discrete phase in the form of nickel-tin-amorphous porous inorganic oxide. Thus, the catalyst mass of the present invention distinguishes from prior art dewaxing catalysts for several reasons, including the factor that the nickel and tin components are not impregnated or ion-exchanged onto or into the mordenite component of the catalyst mass.

It is encompassed as part of the present invention that a layered crystalline clay-type aluminosilicate may also be present with the catalyst composition. The layered crystalline clay-type aluminosilicate can generally be present in small amount, for example, less than 20 weight percent, based on the finished catalyst. The layered crystalline clay-type aluminosilicate may be any catalytically active layered aluminosilicate, although the synthetic hydrated layered crystalline clay-type aluminosilicate of Granquist (U.S. Pat. No. 3,252,757) and the dehydrated form of Capell and Granquist (U.S. Pat. No. 3,252,889) are preferred. Said layered crystalline clay-type aluminosilicates are referred to hereinafter for the sake of brevity as "layered aluminosilicate." The preferred hydrated layered aluminosilicate referred to in U.S. Pat. No. 3,252,757, incorporated herein by reference thereto, has the empirical formula $$nSiO_2 : Al_2O_3 : mAB : xH_2O,$$

where the layer lattices comprise said silica, said alumina, and said B, and where $n$ is from 2.4 to 3.0

$m$ is from 0.2 to 0.6

A is one equivalent of an exchangeable cation having a valence not greater than two, and is external to the lattice B is chosen from the group of negative ions which consists of $F^{7E}$, $OH^{7E}$, $1/20^{7E \cdot 7E}$ 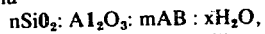 and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A to an upper limit of about 12.0 A when A is monovalent, to about 14.7 A when A is divalent, and to a value intermediate between 12.0 A and 14.7 A when A includes both monovalent and divalent cations. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}MG^{++}$, $\frac{1}{2}Sr^{++}$, and $\frac{1}{2}Ba^{++}$, and mixtures thereof.

The preferred dehydrated layered aluminosilicate referred to in U.S. Pat. No. 3,252,889, incorporated herein by reference thereto, has the empirical formula:

2.4 to 3.0 $SiO_2:Al_2O_3$:0.2 to 0.6AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_{001}$ spacing ranging from 9.6 to 10.2 Angstrom units determined at 50 percent relative humidity and being predominantly ordered in two dimensions. The dehydrated layered aluminosilicate of U.S. Pat. No. 3,252,889 is obtained from the hydrated layered aluminosilicate of U.S. Pat. No. 3,252,757 by calcination at a temperature within the range of 600° to 1,450° F., preferably 600° to 1,200° F. Upon calcination of the hydrated form, and removal of water, the $d_{001}$ spacing of the aluminosilicate collapses somewhat, resulting in a layered aluminosilicate of a smaller $d_{001}$ spacing. According to the teachings of U.S. Pat. No. 3,252,889, the collapse is irreversible and the dehydrated layered aluminosilicate is no longer capable of swelling—apparently the removal of water from the hydrated form results in a new and different chemical and indeed mineralogical species from the starting material.

EXAMPLES

A catalyst mixture containing 50 weight percent mordenite and 50 weight percent nickel, tin and silica was prepared. The nickel-tin-silica component of the catalyst contained 14.3 weight percent nickel and 7.7 weight percent tin, calculated as the metals. The nickel to tin weight ratio was 1.86.

The nickel-silica component of the catalyst was prepared by mixing sodium silicate in water, $SnCl_2 \cdot 2H_2O$, acetic acid and nickel chloride. The resulting mixture was neutralized by the addition of ammonium hydroxide. The resulting slurry was aged for about 1 hour at 200° F. and filtered and then washed with ammonium acetate. In preparing the nickel-tin-silica catalyst, the following amounts of the components were used (or multiples thereof): 87.8 grams of sodium silicate in 4 liters of water, 53.2 grams of $SnCl_2 \cdot 2H_2O$, 180 grams of acetic acid, 447 grams of nickel chloride solution containing 181 grams per liter of nickel, and 8.3 liters of water.

Dry mordenite powder in substantially the hydrogen form was blended with the wet nickel-tin-silica hydrogel. The resulting mixture was then extruded several times and dried at 200° F. overnight and then calcined at an elevated temperature around 900° F. for approximately 2 hours.

The above catalyst is a physical mixture with essentially none of the nickel and tin inside or "supported on" the mordenite component of the catalyst. The nickel-tin-silica gel material consists of very small colloidal particles which are about 50 A in diameter but these colloidal particles are too big to go into the 1 to 10 A pore openings in the mordenite component of the catalyst. Thus, the mordenite exists within the nickel-tin-silica hydrogel structure as discrete fine particles, usually of the order of 5 to 50 microns in size. The nickel-tin-silica particles essentially embrace the very fine mordenite particles. However, there is a large amount of surface area and cracking sites inside the mordenite particles and the nickel and tin of the gel material is a relatively large distance from the inside surface area of the mordenite particles on a molecular diameter basis.

In the present specification, the terms such as nickel and tin, unless otherwise specified are, of course, meant to include nickel compounds and tin compounds such as the oxides and sulfides of nickel and tin.

EXAMPLE 2

A waxy hydrocarbon feedstock containing about 9.5 percent wax, having an ASTM pour point of about 100° F. and a boiling range of about 725° to 950° F., was dewaxed by contacting the feedstock with a nickel-tin-silica-mordenite catalyst prepared as described in example 1. The hydrocarbon feedstock was dewaxed in a laboratory reactor at a temperature of about 720° F., a pressure of about 1,000 p.s.i.g., a hydrogen feed rate of about 5,000 SCF per barrel of oil feed, and an oil feed liquid hourly space velocity of about 1.5. The product obtained from the dewaxing had a pour point which was about 95° F. less than the pour point of the feed. The analysis of the product from the dewaxing was approximately as follows:

| | |
|---|---|
| Product Gravity °API | 34.2 |
| Liquid Yield Wt. % | 84.3 |
| Liquid Pour Pt. ° | +5 |
| Yield Dewaxed Oil Wt.%: | |
| $C_1$ | 0.3 |
| $C_2$ | 0.9 |
| $C_3$ | 5.2 |
| $C_4$ | 3.1 |
| $C_5$-320 | 6.8 |
| 320–500 | 3.2 |
| 500–750 | 13.8 |
| 750+ | 66.7 |
| 750°–850° F. Wt. % | 31.1 |
| Pour Pt. ° F. | −5 |
| 850°–900° F. Wt. % | 16.9 |
| Pour Pt. ° F. | +10 |
| 900° F. Wt. % | 18.7 |
| Pour Pt. ° F. | +15 |

Although various embodiments of the invention have been described, it is to be understood that they are meant to be illustrative only and not limiting. Certain features may be changed without departing from the spirit or scope of the invention. It is apparent that the present invention has broad application to the catalytic dewaxing of hydrocarbon feedstocks using a catalyst mass which is a mixture of mordenite and nickel-tin-amorphous porous inorganic oxide. Accordingly, the invention is not to be construed as limited to the specific embodiments or examples discussed but only as defined in the appended claims.

I claim:

1. A process for catalytically dewaxing an oil which comprises contacting the oil at a temperature between 500° and 900° F., a pressure between 300 and 5,000 p.s.i.g., and in the presence of hydrogen with a catalyst comprising a mixture of mordenite and an amorphous porous inorganic oxide associated with nickel and tin.

2. A process in accordance with claim 1, wherein the amorphous porous inorganic oxide contains from 2 to 50 combined weight percent nickel plus tin with a nickel to tin ratio of 0.25 to 20.

3. A process in accordance with claim 1, wherein the mordenite is in hydrogen form.

4. A process in accordance with claim 1, wherein the mordenite is present in an amount from 10 to 85 weight percent.

5. A process in accordance with claim 1 wherein the mordenite is present in an amount from 65 to 85 weight percent.

6. A process in accordance with claim 1 wherein the catalyst comprises a physical particle-form mixture of the mordenite and the nickel-tin-amorphous porous inorganic oxide.

7. A process in accordance with claim 1 wherein the temperature is between 550° and 750° F. and the pressure is between 750 and 1,500 p.s.i.g.

8. A process in accordance with claim 1 wherein the boiling range of the feedstock is between about 650° and 1,000° F.

9. A process in accordance with claim 1 wherein the porous inorganic oxide is silica.

10. A process in accordance with claim 1 wherein the nickel-tin-amorphous porous inorganic oxide consists essentially of nickel, tin and silica.

11. A process for catalytically dewaxing an oil boiling between about 650° and 1,000° F. which comprises contacting the oil, at a temperature between 550° and 750° F., a pressure between 500 and 1,500 p.s.i.g., and in the presence of hydrogen, with a catalyst comprising a physical mixture of discrete particles of mordenite and in a nickel-tin-silica phase.

* * * * *